United States Patent [19]
Kuhn

[11] Patent Number: 6,022,619
[45] Date of Patent: Feb. 8, 2000

[54] TEXTILE COMPOSITE WITH IRON OXIDE FILM

[76] Inventor: Hans H. Kuhn, 176 W. Park Dr., Spartanburg, S.C. 29306

[21] Appl. No.: 09/007,887

[22] Filed: Jan. 15, 1998

[51] Int. Cl.[7] .................................................... D02G 3/00
[52] U.S. Cl. ............................. 428/373; 428/372; 8/645; 8/637.1; 427/434.6
[58] Field of Search .............................. 427/434.5, 434.6, 427/443.1, 126.6, 121; 428/372, 373; 442/164, 130; 8/623, 495, 645, 637.1, 620, 922; 106/456

[56] References Cited

U.S. PATENT DOCUMENTS

| | | | |
|---|---|---|---|
| 3,657,003 | 4/1972 | Kenney | 117/120 |
| 3,767,590 | 10/1973 | Kenney | 252/313 R |
| 3,958,066 | 5/1976 | Imamura et al. | 428/372 |
| 3,992,343 | 11/1976 | Haschke et al. | 260/29.6 N |
| 4,101,689 | 7/1978 | Wienand et al. | 427/122 |
| 4,386,058 | 5/1983 | Hass | 423/235 |
| 4,404,254 | 9/1983 | Franz et al. | 428/329 |
| 4,435,220 | 3/1984 | Watanabe et al. | 106/291 |
| 4,457,973 | 7/1984 | Matsui et al. | 428/372 |
| 4,473,617 | 9/1984 | van Leeuwen et al. | 428/373 |
| 4,515,850 | 5/1985 | Ishino et al. | 428/225 |
| 4,624,710 | 11/1986 | Modly | 106/290 |
| 4,743,505 | 5/1988 | Yamada et al. | 428/373 |
| 4,803,096 | 2/1989 | Kuhn et al. | 427/121 |
| 4,882,183 | 11/1989 | Ino et la. | 427/126.6 |
| 4,911,957 | 3/1990 | Oishi et al. | 427/443.1 |
| 5,215,782 | 6/1993 | Yoshioka et al. | 427/132 |
| 5,290,589 | 3/1994 | Clough et al. | 427/126.3 |
| 5,432,077 | 7/1995 | Farrah | 435/244 |
| 5,641,470 | 6/1997 | Blagev et al. | 423/632 |
| 5,650,131 | 7/1997 | Lown et al. | 423/632 |

*Primary Examiner*—Shrive Beck
*Assistant Examiner*—Jennifer Kolb

[57] ABSTRACT

A colored textile composite is produced by forming an iron (III) oxide film on a textile surface. This is accomplished by contacting the textile with an aqueous solution having an iron (II) or iron (III) species present. The iron (II) ion resulting from the dissociated iron (II) salt, if an iron (II) salt is utilized, is first hydrolyzed within the aqueous solution and then oxidized under controlled conditions to form iron (III) oxide (hydroxide). The iron (III) ion resulting from the dissociated iron (III) salt, if an iron (III) salt is utilized, is only hydrolyzed under controlled condition to form iron (III) oxide (hydroxide). The iron (III) oxide is then nucleated and forms a smooth and coherent iron (III) oxide film or coating on the surface of the textile without forming an insoluble iron (III) hydroxide precipitate in the solution. This reaction occurs because the reaction conditions are controlled in such a manner as to form sub-colloidal sized iron oxide particles which, in turn, permits a faster rate of adsorption of the iron (III) oxides onto the substrate surface than the rate of formation of the same particles. The iron (III) oxide formed may be goethite, hematite, or magnetite or any mixture thereof. Varying the type of oxide formed allows control over the color shade and other properties of the treated textile composite.

15 Claims, No Drawings

TEXTILE COMPOSITE WITH IRON OXIDE FILM

FIELD OF THE INVENTION

This invention relates to a method of forming textile composites comprising coatings of iron oxides deposited on textile substrates. More particularly, this invention relates to a method for the deposition of iron (III) oxides in status nascendi from an aqueous solution so as to form a coherent coating on a textile substrate. The present invention also relates to articles produced thereby.

DISCUSSION OF THE PRIOR ART

It has long been known that particulates of iron oxides may be used as pigments to dye fabrics. Given the multitude of forms of iron oxides known to exist and the natural abundance of iron, iron oxides can potentially provide an inexpensive, readily available method of coloring textiles. However, the use of iron oxide pigments to dye fabrics has serious drawbacks. This is largely due to the fact that the pigments comprise a plurality of discrete particles or crystals of various iron oxides which do not bind directly to the fabric. Because of this, a binder must be applied with the pigment to hold the individual pigment particles in place. Furthermore, the particles have a very limited ability to penetrate the interstices of the fabric. Thus, the coloring of fabrics with iron oxide pigments is limited to a topical treatment.

In addition to its use as a colorant, metal powder treated particulate iron oxide has been applied to textile fibers in an attempt to increase the conductivity of the synthetic fiber. For example, U.S. Pat. No. 3,958,066 to Imamura et al. discloses one potential method of binding a metal oxide particle directly to a textile fiber. In this method a fiber, in a heated, softened state, is coated with a metal powder or the metal oxide is coated with a metal powder which is then applied to the fiber. The fiber is cooled effectively binding the individual metal particles to the fiber and the bound particles are subsequently oxidized to form metal oxides. This method suffers from the requirement of high temperatures in order to soften and necessarily weaken the fiber as well as the inability to form a truly smooth, coherent, uniform coating of metal oxide from the oxidation of individual metal particles.

The prior art suggests iron oxides may be formed in films under certain conditions. For example, an article by Rochelle M. Cornell, "The Film-Forming Abilities of Iron Oxides and Oxyhydroxides," *Clay Minerals*, vol. 18, pp. 209–213 (1983), suggests that under appropriate conditions dispersed synthetic goethite (an iron oxide hydroxide) may form a self-supporting film upon vacuum-filtration and drying. However, the author does not teach or suggest that an iron oxide film can be deposited on a textile substrate. Ferrite films for textiles or fibers are disclosed in U.S. Pat. Nos. 4,515,850 to Ishino et al. and 4,911,957 to Oishi et al. However, these films are not produced within the same required pH, temperature, and concentration parameters of the instant invention. These patents thus teach away from the presently disclosed invention. In U.S. Pat. No. 4,435,220 to Watanabe et al. transparent, colored pigments are disclosed which are formed by precipitating a mixture of metal oxides, including alkali earth metal oxides, from an aqueous solution and depositing the precipitate of this mixture onto platelet-shaped, inorganic particles, of from 1 to 100 microns in size, formed from materials such as mica, glass, and talc. The precipitation of goethite in crystalline form has also been discussed in a more recent article by Kulamani Parida and Jasobanta Das, "Studies in Ferric Oxide Hydroxides," *Journal of Colloid and Interface Science*, vol. 178, pp.586–593 (1996). U.S. Pat. Nos. 3,657,003 and 3,767,590, both to Kenney, disclose methods of making non-wettable surfaces wettable in applications such as the printing of electrical circuits. Patentee's method entails first providing a salt solution which produces a colloidal mixture of hydrous oxide particles and subsequently immersing the non-wettable surface in this colloidal mixture, ultimately forming a new wettable surface on top of the non-wettable surface. However, there is no disclosure of the utilization of this method for dyeing or changing the color of such a surface. In fact, the surfaces are described as having undergone no visible or detectable changes.

Therefore a need still exists in the field of textile composites for a method of producing materials which have specific, controlled color shades through the formation of smooth, durable, coherent iron (III) oxide films on the surfaces of textiles utilizing inexpensive, readily available iron salts.

SUMMARY OF THE INVENTION

It is thus an object of the present invention to provide a method of producing textile composites which are colored by smooth, coherent coatings of iron oxides. It is another object of the present invention to produce textile composites by this method. Another object of the invention is to color textiles with inexpensive iron oxides. Still another object of the present invention is to provide colored coatings for textiles which are durable, smooth, and coherent. Yet another object of the invention is to apply iron oxides to textiles without subjecting the fibers to damagingly high temperatures and without using binders to adhere the iron oxide to the textile.

Accordingly, a method for producing colored textile composites is provided in which a textile is contacted with a water-based solution containing a dissolved ferrous or ferric salt. In order to produce a substantially amorphous iron oxide coating on the substrate surface an in situ formation of iron oxide particles must first be effectuated. Most important in this in situ formation is that the particles not be macromolecular in size; they must have a sufficiently small average particle size so as to permit polymer-film generation on the surface of the textile. Preferably such particles then are sub-colloidal in size. If the average particle size were too large, and if the colloidal particles in solution would pack together, it could effectively prevent the film-forming ability of the iron oxide. The necessarily small sub-colloidal particles then are adsorbed onto the surface of the substrate. This adsorption is obtained because the rate of reaction of in situ formation of iron oxide particles is slower than the rate of adsorption of the particles to the surface. This can be achieved by maintaining the pH of the water-based solution is maintained at about 2.5 or higher (up to about 8.0), with preferred ranges dependent upon the particular iron oxide films desired, and, at the same time, by heating the solution to a temperature of about 50° C. or higher (up to about 100°, preferably), again with particular ranges for specific iron oxides. It is believed that the iron (II) salt, when utilized, which dissociates in solution to form the corresponding ion is first hydrolyzed to the soluble iron (II) oxide and then oxidized, probably with the available air in the system, to form iron (III) oxide (actually iron oxide hydroxide). If an iron (III) salt is utilized, then the corresponding ion is only hydrolyzed, since it has already been oxidized to the iron (III) state, to form iron (III) oxide (again, actually, iron oxide hydroxide). Although the iron (III) oxide has an extremely slight solubility in water, the conditions of the system such as pH, temperature, and concentrations are controlled so that the iron (III) oxide does not precipitate in solution, but is adsorbed onto the substrate instead, as noted above. In this manner, the iron (III) oxide is not deposited in bulk upon the textile surface; it is formed in situ and subsequently adsorbed on the surface of the textile. It has been found that a substantially amorphous coating of iron (III) oxide is formed which is extremely uniform and coherent, even when viewed microscopically. Textile articles produced according to this method are also provided.

Besides meeting the above objectives, the present invention, in its preferred embodiments, contains one or more of the following features:

the solution additionally contains a base, preferably urea, which releases ammonia when heated in water-based solution at elevated temperatures which neutralizes the acid formed upon hydrolyzation of the iron salt;

the initial iron (II) salt is Mohr's salt;

the solution also contains a buffer system, such as formic acid and ammonium formate, to control further the pH of the solution;

the solution optionally contains a dispersing agent;

the iron (III) oxide coating is either goethite ($\alpha$-FeOOH), hematite ($\alpha$-Fe$_2$O$_3$), or magnetite (Fe$_3$O$_4$), in a substantially pure form;

the iron (III) oxide coating is a selected mixture of goethite, hematite, magnetite, or any combination thereof;

the textile is formed from either natural, inorganic or synthetic fibers, including polyesters and polyamides;

the weight added on to the textile by the iron (III) oxide is in the range from 0.1–5% of the weight of the textile, preferably from 0.3–3%; and the iron (III) oxide coating can be applied without weakening or softening the fibers of the textile, preferentially at temperatures of 100° C. or less.

DETAILED DESCRIPTION OF THE INVENTION

Without limiting the scope of the invention, the preferred embodiments and features are hereinafter set forth. Unless otherwise indicated, all parts and percentages are by weight, temperature is about 90° C., and pressure is from between 1–3 atmospheres. Unless otherwise indicated, the term "iron oxides" is used broadly to denote compounds containing combinations of either iron and oxygen or iron, oxygen, and hydrogen. This includes compounds containing only iron and oxygen, i.e. iron oxides in the narrow sense; compounds containing iron and hydroxide groups, i.e. iron hydroxides; and compounds containing iron with combinations of oxygen and hydroxide groups, i.e. iron oxide hydroxides. Some examples of such compounds are goethite, hematite, lepidocrocite, magnetite, akaganeite, schwertmannite, ferrihydrite, bernalite, maghemite, and wustite. Further examples can be found in the article "Iron Compounds," *Kirk-Othmer Encyclopedia of Chemical Technology*, 4th edition, under the subheading "Oxides and Hydroxides" at pp. 883–884, the teachings of which are incorporated by reference.

As used herein, the term "ferrous" describes compounds containing iron in its 2+ oxidation state. As used herein, the term "ferric" describes compounds containing iron in its 3+ oxidation state.

Other than in the operating examples or where otherwise indicated, all numbers expressing quantities of ingredients or reaction conditions used herein are to be understood as modified in all instances by the term "about" and are impliedly expressed as percent of the weight of the fabric (% owf).

All of the United States patents and other publications cited within this Specification are incorporated herein by reference.

A textile composite formed according to the present invention comprises a textile substrate onto which a smooth, coherent coating of one or more iron (III) oxides has been deposited. This deposition occurs via the oxidation of iron (II) ions which are in an aqueous solution to iron (III) ions under reaction conditions such that iron (III) oxide, in status nascendi, is nucleated in situ on the surface of the textile without precipitation of the iron (III) oxide within the solution in appreciable quantities. There are some instances also where the precipitate of iron (III) oxide is in a colloidal state. This is controlled through the utilization of the specific method of the instant invention. Careful adjustments within the pH, temperature, and concentration parameters herein disclosed should provide a solution wherein the average oxide particle size is low enough to effectuate the desired formation of iron oxide film.

The textile substrate employed comprises fibers in the form of yarns, including those in staple, spun, or continuous multifilament form, or chopped fibers, or it may be in the form of a fabric. Preferably the textile is in fabric form. This fabric is of woven, knit, or non-woven construction, and is preferably woven.

A wide variety of natural, synthetic, and inorganic materials may be used in the textile. The main problem with such fibers is that they must be able to withstand processes utilizing large amounts of water. The melt properties of the fiber are in general not an obstacle since the coating is deposited at temperatures of about 100° C. or less and the softening of the fiber with increased temperatures is unnecessary in order for the coating to adhere. Thus, any fiber material which is not damaged by the presence of water or by temperatures of about 100° C. is usable. By way of example, the following materials may be employed: polyamides, including nylon, such as nylon 6 and nylon 6,6 and aramids; polyesters, such as polyethylene terephthalate (PET); polyolefins, such as polypropylene and polyethylene; acrylics; polyurethanes; cellulosic materials, such as cotton, rayon, and acetate; and inorganic fibers, such as aluminum oxide fibers and boron-derived fibers. Preferably the textile is selected from polyester or polyamides.

A wide range of fabric weights and deniers may be employed; however, fabrics weighing 1 to 20 oz/yd$^2$, preferably 2 to 10 oz/yd$^2$, may be employed. Knit and woven fabrics may be constructed from staple and continuous filament yarn, such as yarn having a denier of 0.5 to 30, preferably 0.5 to 5.

A coherent iron oxide film is deposited on the textile by oxidation of iron (II) hydroxide in an aqueous solution which is then contacted with the textile. The amount of solution used is based on the weight ratio of the solution to the textile to be coated. The ratio of textile to solution may range from 1:3 to 1:50, preferably 1:8 to 1:30, and most preferably 1:10 to 1:20.

Virtually any water-soluble iron (II) or iron (III) salt may be utilized to produce this solution. By way of example, iron sulfate, iron chloride, iron bromide, iron iodide, Mohr's salt, and iron acetate may be utilized. In one preferred embodiment of the present invention, Mohr's salt, a ferrous salt having the formula Fe(NH$_4$)$_2$(SO$_4$)$_2$.6H$_2$O, is utilized.

The concentration of the iron (II) present in the solution, expressed as the weight percent of iron (II) ions within the entire solution, may range from 0.1 to 10, preferably from 0.5 to 5 and most preferably from 0.5 to 3.

In one preferred embodiment of the present invention the aqueous solution also comprises a compound which releases ammonia in aqueous solution as an acid neutralizer. Examples of such compounds include urea, formamide, and acetamide. This ammonia-producing compound is present in solution in a concentration range from 1 to 30 g/L. Preferably, the compound employed is urea at a concentration of from 1 to 30 g/L and ideally 2 to 15 g/L.

In another preferred embodiment of the present invention the aqueous solution additionally comprises a dispersing agent. Although its role in the formation of the coating is not completely understood, it has been found to increase the yield, the rate of reaction, and uniformity of the coating process. Suitable examples of ionic dispersing agents include sulfonated organic compounds. Preferably the dispersing agent is a sulfonated alkyl naphthalene, such as Rhodacal BX-78™ available from Rhoône-Poulenc. The dispersing agent is used in the solution at a concentration of from 0.1 to 5 g/L and is preferably from 0.3 to 0.8 g/L.

In another preferred embodiment of the invention, the solution additionally comprises a buffer system for regulation of the solution pH due to the production of acid. The buffering system comprises a weak acid together with a water-soluble salt whose anion is the weak acid's conjugate base. Such buffering systems are well-known to those skilled in the art and may include acetic acid/sodium acetate, formic acid/ammonium formate, and acetic acid/ammonium acetate. Preferably the buffering system comprises formic acid/ammonium formate. The concentrations of the weak acid and salt containing its conjugate base will vary depending on the final pH at which the solution is to be buffered. In general these concentrations in the solutions will each range from 0.5% to 10% by weight. The exact concentrations needed to achieve a given pH can be calculated by methods which will be appreciated by those skilled in the art.

The resultant iron oxide film comprises one or more forms of iron (III) oxide which is nucleated in situ on the surface of the textile. This process differs from prior art teachings in which iron (II) ions are subjected to strong oxidation conditions under which a large part of the iron (II) is oxidized to iron (III). The iron (III) ions then form significant amounts of iron (III) oxide in solution which precipitates out, in effect clouding the solution. In contrast, the process of the present invention involves the careful control of solution variables such as temperature, pH, and concentration so that iron (III) oxides (which are, again, in actuality, iron oxide hydroxides) do not actually precipitate in a colloidal or visible state, as noted previously, but iron (III) oxides are only formed in situ, adsorbed to the surface of the textile, and deposited thereon in status nascendi. With proper selection of the reaction conditions, the textile is coated without ever causing haziness or clouding in the solution due to the precipitation of iron (III) oxides in solution.

A number of types of iron oxides may be deposited on the textile by the process of the present invention. By way of example only, the coating may comprise goethite, lepidocrocite, hematite, magnetite, or a combination of these forms. Certain iron oxide forms produce certain colors on and lend other characteristics to the composite. If small amounts of other metal oxides are present on the textile surface, they may also modify the color produced or properties obtained. Thus, as an example, a coating of substantially pure goethite may be a preferred embodiment for one application, a coating of substantially pure hematite may be a preferred embodiment for a second application, and a coating of substantially pure magnetite may be a preferred embodiment for yet another application.

The surface of the coating deposited by the present invention has been found to have good qualities of smoothness, coherence, and uniformity. By "uniformity" it is meant that the thickness of the film coating formed does not vary significantly from area to area on the textile surface. Coherence means that the film coating formed is substantially continuous without significant areas of the textile surface left uncoated. Although some crystalline formations have been found on the textile surface subsequent to the coating of the textile, the quantity of these formations is substantially reduced from purely crystalline pigment colorations not produced from the instant inventive process. The smooth coating is noticeable in this process using microscopy and is not readily present on textiles colored with iron oxide pigments. If iron (III) salt is utilized as the initial iron source, the size of any crystalline formations is substantially reduced from where an iron (II) salt is utilized initially. The thickness and add-on weight of the coating formed may vary considerably. The thickness may range from 0.01 to 2 microns and is preferably from 0.1 to 0.5 microns. The add-on weight as a percentage of the textile weight ranges from 0.2 to 5 and is preferably from about 1 to about 2 percent.

As noted above, reaction conditions such as temperature and pH are carefully controlled to form a smooth, coherent coating of iron (III) oxides in the present invention. The temperature to which the aqueous solution is heated can vary but is in the range of about 60° C. to about 100° C. Preferably the temperature is about 70° C. to about 95° C. and more preferably about 80° C. to about 95° C. Likewise the exact pH may vary, but it has been found that the pH must at least 2.5 and is preferably greater. The pH range chosen, together with the concentration of all the ions in the aqueous solution and the system temperature will determine whether the iron oxide film formed is goethite, hematite, lepidocrocite, magnetite, or some mixture of thereof. However, it has been found that goethite is generally formed in the pH range of about 2.5 to about 4.5 while hematite and magnetite are generally formed in the pH range from about 4.0 to about 7.0. At this pH range, hematite is formed if the system is closed to the air while magnetite forms if the coating mixture is open to the air. Air is, in fact, added to each system if it is closed in a 2:1 ratio of water to air. It is believed the dissolved oxygen in the water as well as the atmospheric oxygen are sufficient for oxidation of the iron (II) compound. If the system remains open, indefinite amounts of air are utilized.

Under certain conditions, the surface may additionally comprise esters of the acids present in the reaction mixture such as hydroxysulfate esters. The type of ester present will vary with the type and concentration of the acid species in solution.

The time necessary for the deposition of the coating onto the textile surface depends on the thickness desired and the reaction conditions, i.e. temperature, pH, and concentrations, used. In general, the solution is contacted with the textile at reaction conditions for 1 to 4 hours, preferably 1.5 to 2.5 hours.

In a preferred embodiment of the present invention, the coated textile is rinsed with clean water until all remaining water soluble compounds are removed and then dried.

The determination of which type or types of iron oxides are present is conducted using X-ray diffraction techniques. The normal conditions and procedures of the present invention are followed as closely as possible except that no textiles are used leading to the formation of crystals of the iron oxide which are large enough to allow the material to be filtered and analyzed by conventional X-ray diffraction techniques. Additional analytical data may be obtained by X-ray fluorescent measurements on the coated fabric for instance to detect the formation of sulfate esters. Determination of the infrared spectra of the coated fabric can also be helpful in the determination of certain iron oxides.

The method of the present invention and products formed thereby find a utility in a multitude of applications. As previously discussed, the coatings of the present invention have distinct color shades based on the iron oxide or oxides present in the film. These colors actually range from yellows to oranges to reds to browns. These properties, combined with the excellent lightfastness of the coatings, allow the utilization of the present invention for the dyeing or coloring of textiles.

Another use of the present invention is to improve the wicking and hydrophilic properties of normally hydrophobic materials such as polyester. It has been found that the deposition of iron oxide on the surface of textiles changes their surface characteristics quite dramatically. It is known that the surface free energy of iron oxides such as goethite and hematite is quite high as compared to that of hydrophobic textile surfaces formed from synthetic fibers. Textile surfaces treated with iron oxide therefore show improved wetting characteristics with high surface tension liquids such as water. This is particularly beneficial in filtration applications and other end uses where wetting is desirable. Of particular interest regarding the potential filtration applications is the fact that the iron salts utilized within the inventive method are frequently ingested for medicinal purposes (i.e., increase red blood cell production) and thus are extremely low in toxicity.

Additionally, the present invention may be used to improve the chemical resistance of textiles. It has been found that goethite and hematite are immune to attack from most acids and bases. Deposits of such materials in laboratory glassware, for example, can only be dissolved with concentrated hydrochloric acid. Therefore coatings of goethite or hematite can be used for the preservation of synthetic and natural fibers from chemical attack. Such a property may be beneficial in particular to cotton fibers which, for certain application, must withstand strenuous soil barrier treatment tests.

Still another use of the present invention is to provide a textile with an inorganic surface coating which can be further reacted with ionic species including but not limited to sulfates and phosphates.

The present invention may also be utilized for providing media to polish metals.

Yet another use of the present invention is to provide textiles with magnetic properties. In a preferred embodiment in which reaction conditions are selected such that magnetite is coated onto the textile, the textile can be used for the purpose of providing electromagnetic shielding in electronic devices.

PREFERRED EMBODIMENT OF THE INVENTION

The general method utilized was as follows:

Approximately 100 grams of fabric were placed in a Werner Mathis J F dyeing machine having a rotating basket insert and a liquid capacity of approximately 3 liters. The chemicals used were mixed in a separate beaker with water. The total volume of water and chemicals was 2 liters. This mixture of chemicals was then introduced through an addition tank into the aforementioned dyeing machine. The rate of agitation was set at approximately 60 turns per minute with an interrupted clockwise and counter clockwise turning mode. The reaction temperature was set at the desired level and heating occurred at the maximum rate until the final temperature was reached. Unless otherwise indicated, the reaction continued for two hours at the desired temperature. After this time, the machine was set on automatic cooling and the liquor was decanted when the temperature reached approximately 50° C. The fabric was subsequently washed three times with water and then withdrawn from the machine and air dried. All of the resultant fabrics showed excellent wicking properties.

Unless otherwise stated, a polyester fabric consisting of a 2×2 right-hand twill, weighing approximately 6.6 oz. per sq. yard and being constructed from a 2/150/34 textured polyester yarn Type 667 from Wellman Inc. was utilized. The fabric construction was approximately 70 ends per inch in the warp direction and 55 picks per inch in the fill direction. Fabrics different from the above polyester fabric were obtained from Testfabrics Inc. of Middlesex, N.J. and reported under their style number. All of the fabrics used were scoured with a scouring agent, preferably Rhodacal BX-78™ (a product of Rhône-Poulenc), prior to use.

EXAMPLE 1

A solution was prepared using 15 g of Mohr's salt with the formulation $(NH_4)_2Fe(SO_4)_2.6H_2O$ in approximately one liter of water. Separately, a solution of 1.32 g of ammonium formate, 1 g of formic acid, 1.2 g of Rhodacal BX-78™, and 10 g urea was dissolved in another 1 liter of water. The two solutions were combined by adding the second solution to the first. The pH of the solution was 3.6. The solution was added to the dye machine as described above and heated at 90° C. for two hours. At this time, the pH of the solution was 3.6 and, after drying, the fabric showed a pick up of about 1.5 g. The resultant color was a bright yellow.

EXAMPLE 2

The procedure from Example 1 was repeated except that the fabric was a knitted Nylon 6 fabric, Style 322 from Testfabrics. The pH of the solution was essentially the same as in Example 1 and the fabric picked up a total of 1.2 g of the yellow iron oxide.

EXAMPLE 3

Example 1 was repeated except that the fabric consisted of a mercerized cotton Style 407 from Testfabrics. Again the pH of the liquor was identical to the one in Example 1 and the pick up of iron oxide on the final fabric was about 1.3 g.

EXAMPLE 4

Example 1 was repeated except that a spun nylon Style 354A from Testfabrics was used. Again the pH of the liquor was as in Example 1 and a total of 2 g of iron oxide was deposited on the surface of the fabric.

EXAMPLE 5

The procedure from Example 1 was repeated except that a fabric Style 983 from Testfabrics comprising 100% spun polyester yarn was used. Again the pH was in the same region as in Example 1 and the fabric gained approximately 2 g in weight.

EXAMPLE 6

The procedure from Example 1 was repeated except that an acetate tricot Style 113 from Testfabrics was employed. Again the pH of the fabric was in the same range as in Example 1 and the fabric increased approximately 2 g in weight.

EXAMPLE 7

The procedure from Example 1 was repeated except that now a Style 266W from Testfabrics comprising a spun viscose yarn was tested. The pH of the solution changed from 3.6 to 3.8 and the fabric picked up a total of 3.5 g of iron oxides.

EXAMPLE 8

Example 1 using regular polyester fabric was repeated except that the formulation was changed as follows: 22.5 g of Mohr's salt, 1.32 g. of ammonium formate, 2 g of formic acid, 1.2 g of Rhodacal BX-78™ and 10 g urea. The pH of the solution changed from 3.8 to 3.2 and a very bright colored sample of yellow polyester was obtained. The fabric picked up approximately 1.5 g of iron oxides.

EXAMPLE 9

The procedure of Example 1 was repeated except that the chemicals were chosen as follows: 15 g of Mohr's salt, 2.88 g of formic acid, 0.6 g of Rhodacal BX-78™, and 30 g of urea were used. The pH of the solution changed from 2.9 and 4.3 and a piece of bright yellow dyed polyester fabric was obtained. The weight gain was 2.3 g.

EXAMPLE 10

Example 9 was repeated except that no fabric was added to the dye machine. As time progressed, the liquor became more and more cloudy as the formation of the insoluble iron oxides proceeded through the hydrolysis of the iron salt. The pH of the solution was identical to the one in Example 9. After cooling, the contents of the dye machine were put into a 3 liter beaker and left standing over night. The following morning, the clear aqueous part was decanted and the rest of the material was filtered through a Buchner funnel, collected, and dried. Approximately 1.5 g of iron oxides were isolated and were submitted for an X-ray diffraction analysis. The material was determined to comprise approximately 95% goethite.

EXAMPLE 11

Example 1 was repeated utilizing regular polyester fabric and a formulation of 15 g of Mohr's salt, 0.6 g of Rhodacal BX-78™, and 30 g urea. Contrary to previous experiments, the dye machine was left open against the air so that oxygen from the air could continue to add into the mixture. The pH ranged from 4.2 to 4.7, the polyester fabric was colored in a deep orange red, a color typically for the formation of hematite. The fabric picked up approximately 3.3 g of the iron oxide.

EXAMPLE 12

Example 11 was repeated exactly as above except that the agitation in the dyeing machine was increased to about 90 rpm allowing more oxygen to be incorporated into the liquor. This resulted in a pH which now started at 4.6 and ended after 2 hours at 6.6. It was noticed that during the first half hour the fabric turned orange indicating the deposition of hematite which was followed by a brownish deposition for the rest of the experiment. The fabric showed magnetic properties upon exposure to a magnetic field.

EXAMPLE 13

Example 12 was repeated except that no fabric was placed in the reaction vessel. In addition, no Rhodacal BX-78™ was added to the solution. The pH changed from 4.8 to 6.0 and the precipitate changed from orange to brown. The material was collected in a 3 liter beaker and left to settle overnight. The brown precipitate could be moved with a magnet indicating the presence of a magnetic iron oxide, most probably magnetite. X-ray diffraction showed a mixture of approximately one-third goethite, one-third hematite, and one-third magnetite.

EXAMPLE 14

Example 1 was repeated utilizing regular polyester fabric and the following chemicals: 14.17 g of a 34% ferrous chloride solution supplied by Phibro-Tech Inc. and 30 g of urea. The resultant fabric was colored in a deep orange, indicating the formation of hematite. The pH changed from 3.0 to 6.3 and the weight increase of the fabric was 2.3 g.

EXAMPLE 15

Example 14 was repeated except that the pH was initially adjusted with dilute hydrochloric acid to about 2.2. After 2 hours at 90° C., the pH of the liquor increased to 4.5 and the polyester assumed an orange color indicating the formation of hematite. The deposition of iron oxide on the fabric was 1.2 g.

EXAMPLE 16

Example 1 was repeated utilizing regular polyester fabric except that only 10 g of Mohr's salt was used without any additional chemicals and the temperature was set at 130° C. for 1 hour. The pH changed from 3.5 to 2.7 and the fabric showed the typical orange color indicating the deposition of hematite. The fabric picked up approximately 1 g in weight.

EXAMPLE 17

This example shows the difference between an in situ formation of iron oxide versus the use of a pre-prepared colloidal solution of iron oxide. The conditions of Example 1 were repeated utilizing regular polyester fabric. A preformed colloidal solution of iron oxide was prepared according to an article published in the J. Colloidal & Interface Sci, 63, 3, Mar. 1, 1978, by Egon Matijevic and Paul Scheiner entitled "Ferric Hydrous Oxide Sols III," the entire article being incorporated herein by reference. Preparation of uniform particles by hydrolysis of Fe (III)-chloride,-nitrite, and-perchlorate solutions. The actual material used is described on page 520, FIG. 8, under b. 21 g of the colloidal hematite solution containing 4.79% solids were added to 2 liters of water. The pH of the solution was brought to 3 by the addition of 2 drops of concentrated formic acid. By increasing the temperature from room temperature to approximately 50° C., which took approximately 5 minutes, one could already observe a significant decrease in the coloration of the liquid. After additional 10 minutes, the temperature of 90° C. was reached and the pH was still 3.0. At this time, the water was almost clear. After an additional 15 minutes at 90° C., the pH was again 3.0 and the liquor was now entirely colorless. Cooling then commenced upon which a trace of color reappeared in the liquor. The sample was washed three times with water. It showed the typical color of a hematite deposition and gained 1.2 g in weight. A sample of the liquor obtained at the end of the reaction cycle was submitted for iron determination by atomic emission spectrum and was practically free of any residual iron. Analysis of the polyester fabric by scanning electron microscopy showed the deposition of the original particles to the surface of the fabric. The film was non-coherent and considerably less uniform than noted in the examples of this invention, above.

EXAMPLE 18

The conditions of Example 1 were repeated utilizing regular polyester fabric but using 18.44 g of ferric ammonium sulfate of the formula $NH_4Fe(SO_4)_2 \cdot 12H_2O$ without any further additives and conducting the reaction at 70° C. for 2 hours. The pH changed from 2.5 to 2.0 and at the end of the reaction the pickup amounted to 1.6 g. The fabric showed a dull yellow color typical for ferric-hydroxy sulfate.

EXAMPLE 19

The same experiment was conducted with the exception that no fabric was added to the dye machine. The pH changed from 3.0 to 2.0 and 1.37 g of a yellow solid was obtained after filtration. X-ray diffraction analysis indicated that the material consisted of 95% ferric-hydroxysulfate.

There are, of course, many alternative embodiments and modifications of the present invention, which are intended to be included within the spirit and scope of the following claims.

What is claimed is:

1. A method of making a colored textile fabric composite comprising the steps of:
   (a) contacting a textile fabric with an aqueous solution of a ferrous or ferric salt at a pH of from about 2.5 to about 4.5 wherein said aqueous solution optionally comprises (i) a compound which produces ammonia by hydrolysis in aqueous solution, (ii) a buffering and pH controlling system, and (iii) a dispersing agent;
   (b) heating the solution in step (a) to a temperature between about 50° and 100° C. while in contact with the textile fabric; and
   (c) hydrolyzing and oxidizing the ferrous ion, or hydrolyzing the ferric ion, to form an iron (III) oxide and nucleating the iron (III) oxide in situ at the surface of the textile fabric, wherein said iron (III) oxide is present in the solution as particles being sub-colloidal in size, thereby forming a coherent iron (III) oxide coating on the textile fabric surface;
   wherein the resultant rate of adsorption of the iron (III) oxide particles onto the textile fabric surface is greater than the resultant rate of formation of the iron (III) oxide from the initial ferrous or ferric salt;
   wherein said coating of iron (III) oxide is selected from the group consisting of goethite, hematite, and any mixture thereof.

2. The method of claim 1 wherein said solution additionally comprises a compound which produces ammonia by hydrolysis in aqueous solution.

3. The method of claim 2 wherein said ammonia-producing compound is urea.

4. The method of claim 1 wherein said ferrous or ferric salt is a ferrous salt.

5. The method of claim 4 wherein said ferrous salt is Mohr's salt.

6. The method of claim 1 wherein said solution also comprises a buffering and pH controlling system.

7. The method of claim 6 wherein said buffering and pH controlling system comprises formic acid/ammonium formate.

8. The method of claim 1 wherein said solution also comprises a dispersing agent.

9. The method of claim 1 wherein said iron (III) oxide coating is substantially pure goethite.

10. The method of claim 1 wherein said iron (III) oxide coating is substantially pure hematite.

11. The method of claim 1 wherein said textile composite comprises fibers selected from the group consisting of natural, synthetic, and inorganic fibers.

12. The method of claim 1 wherein said aqueous solution comprises Mohr's salt, urea, a dispersing agent, and a buffering and pH controlling system.

13. The method of claim 1 wherein the temperature in step "b" is about 100° C.

14. An article comprising the product of the method of claim 1.

15. An article comprising the product of the method of claim 11.

* * * * *